United States Patent [19]

Hynes

[11] Patent Number: 4,979,929
[45] Date of Patent: Dec. 25, 1990

[54] TORQUE TRANSMITTING ADJUSTABLE BELT

[76] Inventor: Robert Hynes, 635 Springer Rd., Fairfield, Conn. 06430

[21] Appl. No.: 401,665

[22] Filed: Aug. 31, 1989

[51] Int. Cl.[5] .............................................. F16G 7/04
[52] U.S. Cl. .................................... 474/206; 474/250
[58] Field of Search ............... 474/255, 253, 206, 207, 474/232–235, 250

[56] References Cited

U.S. PATENT DOCUMENTS

| 2,365,866 | 12/1944 | Dalrymple | 474/234 X |
|---|---|---|---|
| 4,002,082 | 1/1977 | Waugh | 474/250 |
| 4,254,666 | 3/1981 | Seredick | 474/250 X |

FOREIGN PATENT DOCUMENTS 0967401 5/1975 Canada ................. 474/234

*Primary Examiner*—Thuy M. Bui
*Attorney, Agent, or Firm*—Arthur T. Fattibene; Paul A. Fattibene

[57] ABSTRACT

An adjustable torque transmitting belt comprising a plurlity of links. The links are attached end to end forming a belt of any desired length. The ends of the belt formed by the plurality of links are attached together by combining three different specialized links with a flexible bolt. The flexible bolt fits through a bore in a male link attached to one end of the belt, then through a bore in a rotator link, then treaded into a female link attached to the other end of the belt. A continuous loop belt is then formed that can be easily adjusted by the specialized link and flexible bolt assembly. A single flexible elongated link may be utilized in lieu of a plurality of smaller links. In another embodiment a plurality of identical links are assembled together to form an adjustable continuous belt. Each link can be securely attached without the use of tools due to the flexible nature of the configuration and the material of the similar links.

5 Claims, 4 Drawing Sheets

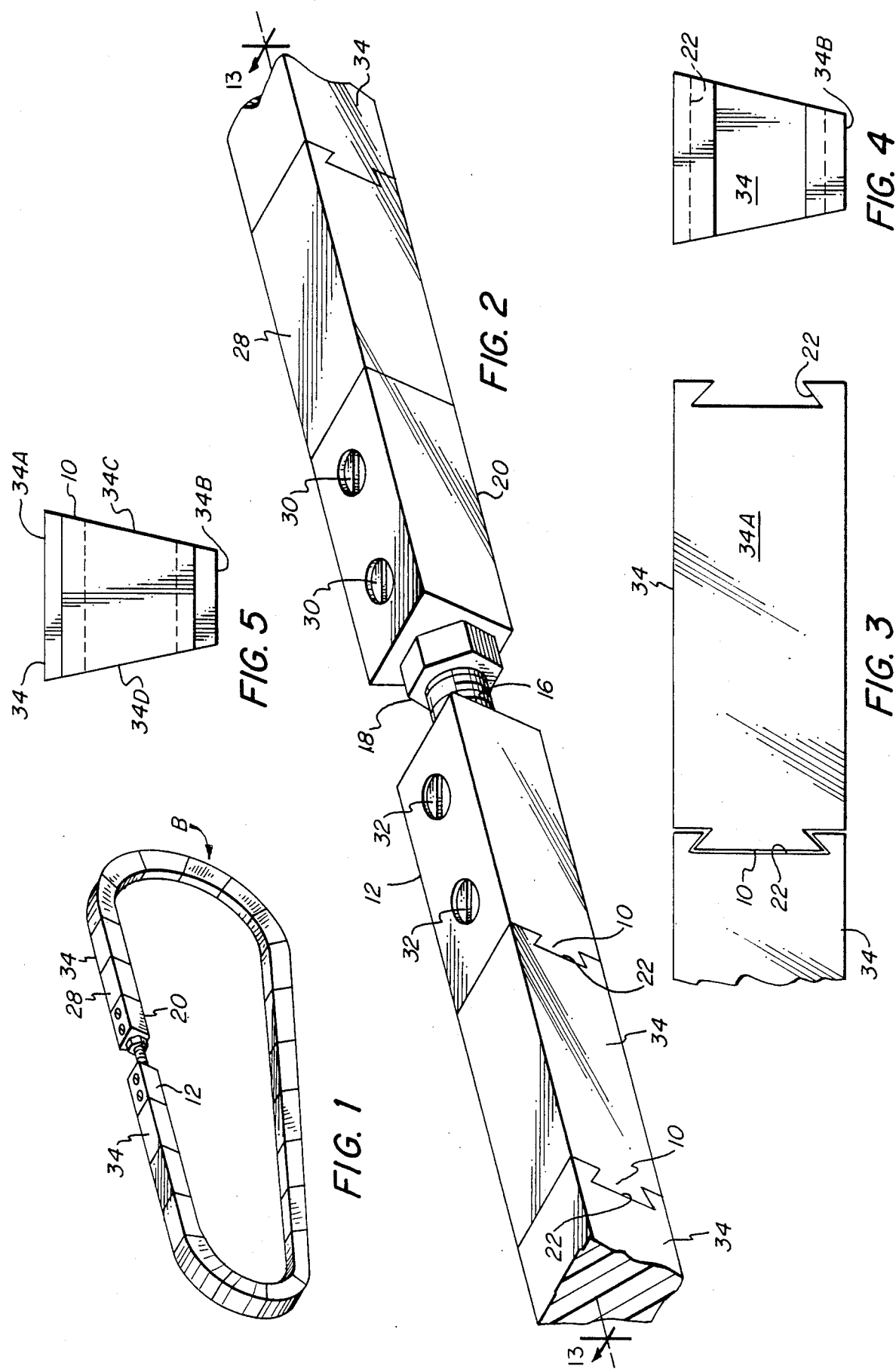

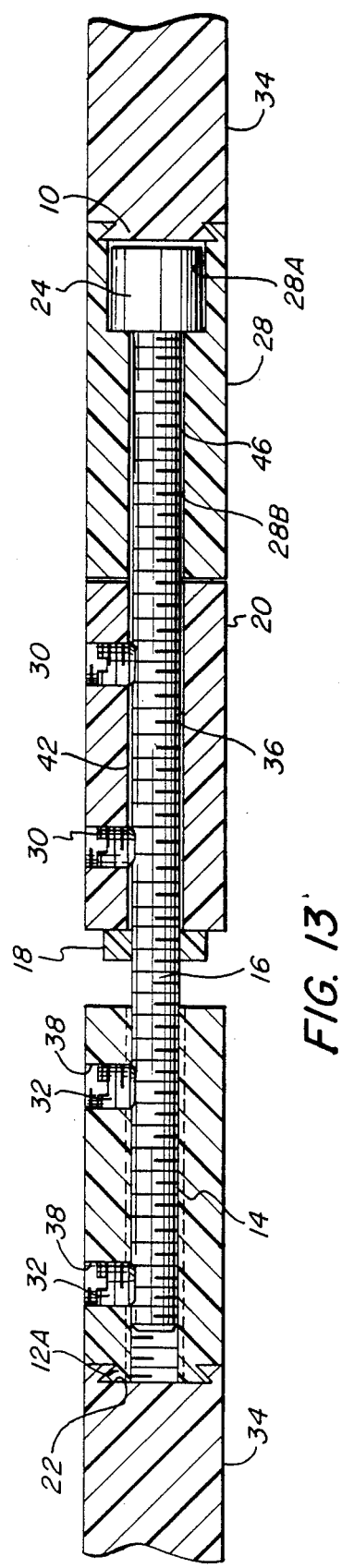

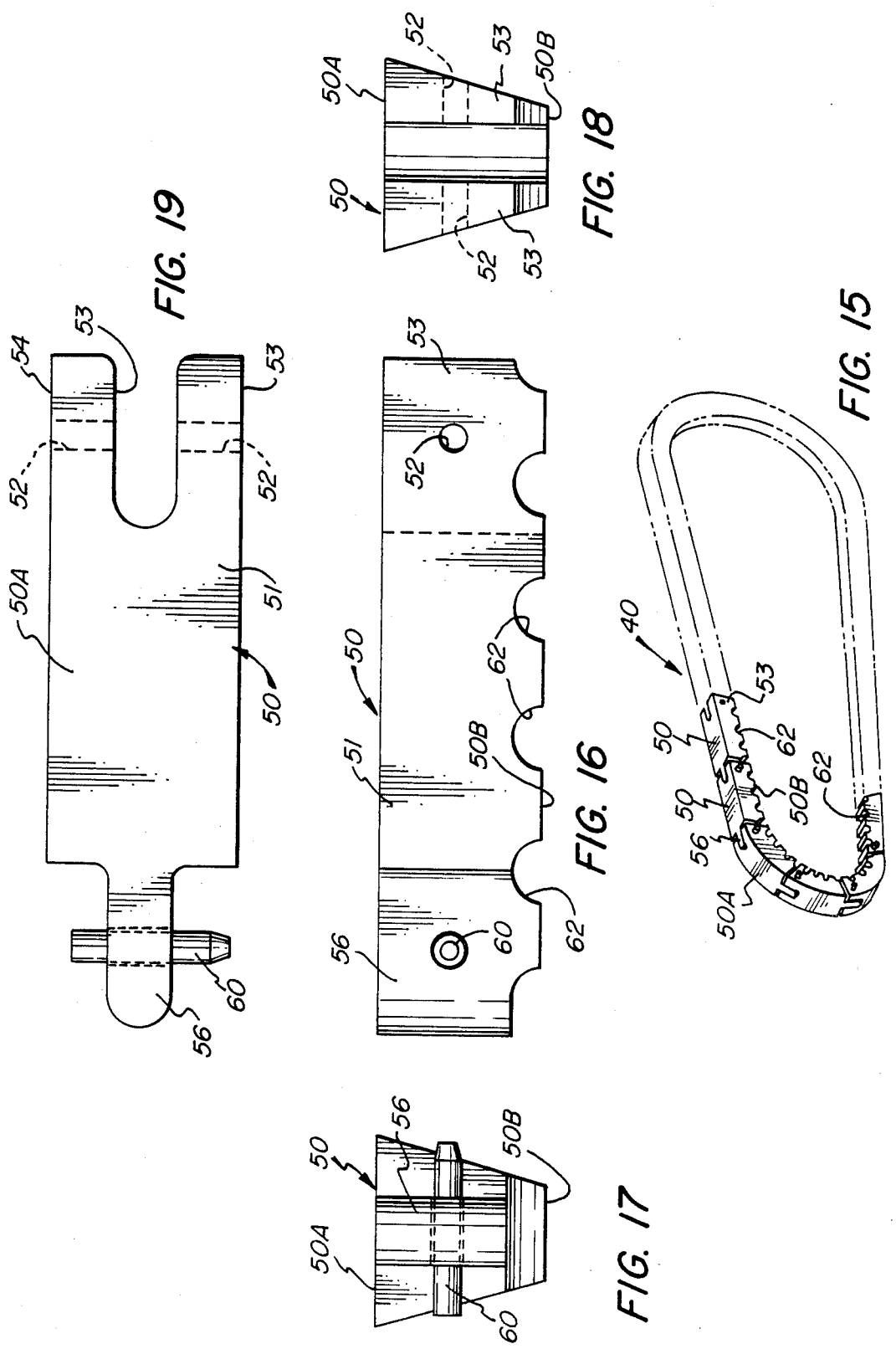

TORQUE TRANSMITTING ADJUSTABLE BELT

FIELD OF INVENTION

This invention relates generally to belts used to transmit torque between pulleys and more particularly to an adjustable segmented belt having a plurality of links.

BACKGROUND OF THE INVENTION

Belts are common means to transmit torque between rotating devices. An example of a widespread use of a torque transmitting belts is the belt used in an automobile engine to rotate various accessories, customarily known as the fan belt. Most belts are a continuous loop of fixed length. As a result, there are many different size belts for many different applications. For example, each make and model of automobile is likely to require a different size fan belt. This necessitates the availability of a large inventory of belts varying in size to quickly accommodate the replacement of a worn or broken belt. In order to avoid costly idle or down time of machinery, it is important that a worn or broken belt be replaced quickly.

The replacement of a broken or worn endless belt frequently constitutes a time consuming and tedious task. To replace such endless belts, e.g. in a vehicle, tools are required. This is because some part of the vehicle to which the belt is connected has to be loosened to provide the play necessary to effect the removal of such endless belt. Frequently, the part which must be moved to allow the play is difficult to get to. Thus, considerable effort and time is involved in replacing an endless type belt.

Heretofore, belts with adjustments have been made to compensate for wear, or for use in more than one application within a predetermined relatively small range. One such belt is disclosed in U.S. Pat. No. 1,264,193 issued to H. W. Leonard on Apr. 30, 1918 and entitled "Elastic Belt." Therein disclosed is a belt made up of a number of links or sections. The section can be either elastic or non-elastic, provided there is a sufficient length of elastic portion to give advantageous results. The elastic sections comprise a coiled spring as a core enveloped by a plurality of washers loosely movable over the spring core. Each section is connected to the adjacent section by a threaded hub connector. U.S. Pat. No. 4,058,022 to Pickburn on Nov. 15, 1977, entitled "Mobius Drive Belt Fastener" discloses a belt twisted to form a Mobius strip and a fastener to connect the ends together. The twist in the belt doubles the surface area of the belt contacting the pulleys, thereby extending the life of the belt.

U.S. Pat. No. 3,631,732 to E. Kleban entitled "Adjustable Belt Assembly" discloses a belt having coupling elements for adjusting the length of the belt that are either wholly confined within the cross-sectional area of the belt material or extend from the belt surface and receive a bolt for closing the ends of the belt.

Each of these belts are difficult to install and require tools for their installation. This complicates their quick and easy replacement, especially in emergency situations where assistance and the necessary tools are unavailable.

Also known are link type conveyor belts such as disclosed in U.S. Pat. Nos. 2,766,635; 1,896,407 and 1,861,642. However, such link type conveyor belts are not suitable for use in vehicles or other machine applications for coupling rotating machines for transmitting torque.

OBJECTS

An object of this invention is to provide an improved endless type belt formed of a plurality of similarly constructed link members that can be readily coupled together to form an endless belt of any predetermined length.

Another object is to provide an endless belt which can be of any predetermined length and which can be readily adjusted to regulate the amount of play therein within given limits.

Another object is to provide an improved endless belt which can be readily installed without the use or need of any special tools.

Another object is to provide an endless belt which is rendered readily flexible throughout.

Another object is to provide an endless belt for the transmission of torque between two or more rotating parts formed of connected links that are similar in size and shape.

Another object is to provide an endless belt composed of a plurality of links which are mechanically coupled by complementary interconnecting surfaces.

Another object is to provide for an endless, flexible belt which can be readily adjusted within predetermined limits that is relatively simple in construction and positive in operation.

SUMMARY OF THE INVENTION

The foregoing objects and other features and advantages are attained by a flexible endless belt comprised of a plurality of similarly constructed links that are coupled in end relationship by complementary interlocking surfaces. The respective ends of the coupled links are adjustably connected by a coupling link having a bore extending therethrough for rotatably receiving a threaded fastener. Fixedly connected to an extended portion of the threaded fastener is a link segment to manually facilitate the rotation of the fastener. Connected to one end of the connected link belt is a receiver link to which the fastener is connected to secure the opposed ends of the link belt to form an endless flexible link belt. The arrangement is such that the endless belt can be readily applied to cuple two or more rotating parts to effect the transmission of torque therebetween without the need of any special tools or displacement of the rotating parts and whereby the play of the belt can be readily adjusted. In another form of the invention, a single elongated flexible link may be utilized in lieu of a plurality of small flexible links.

In another embodiment, the adjustable belt is composed a series of similar links. In this form, each link includes a female end portion having extended opposed flexible ears with a coupling hole extended through each ear. At the other end of the link is provided with a flexible male portion having a pin extending laterally therefrom. To form the flexible belt, a plurality such similar links are coupled end to end by hooking the pin at the male end into the holes formed at the female end. The links are sufficiently flexible so that they can be twisted together by hand, thereby permitting assembly and adjustment without tools.

FEATURES

Therefore, it is a feature of the present invention to provide a replaceable belt that can be readily installed without the use of special tools and with a minimum of effort.

It is a further feature of the present invention to provide a belt construction that will eliminate the need of an inventory of different length belts.

It is a feature of the present invention to provide a flexible fastener to join the two ends of the belt together.

It is a further feature of the present invention to provide an endless belt formed of a plurality of readily interconnected links of similar shape.

It is another feature of the present invention residing in the provision of a rotator link between a male and female coupling link.

It is an advantage of the present invention that the belt is adjustable.

These and other objects, features and advantages will become more readily apparent in view of the following detailed description and claims.

BRIEF DESCRIPTION OF THE DRAWINGS

FIG. 1 is a perspective view of one embodiment of the complete invention.

FIG. 2 is a perspective view of the coupling portion of the invention.

FIG. 3 is a plan view of an individual link of the invention.

FIG. 4 is a right end view of the link in FIG. 3.

FIG. 5 is a left end view of the link in FIG. 3.

FIG. 13 is a cross-section taken along line 13—13 in FIG. 2.

FIG. 14 is a perspective view of a second embodiment of the complete invention.

FIG. 15 is a perspective view of a modified belt assembly.

FIG. 16 is a detail side view of the link construction to form the belt assembly of FIG. 15.

FIG. 17 is an end view of the male portion of the link illustrated in FIG. 16.

FIG. 18 is an end view of the female portion of the link illustrated in FIG. 16.

FIG. 19 is a plan view of the link illustrated in FIG. 16.

DETAILED DESCRIPTION OF THE PREFERRED EMBODIMENTS

Figure 7:
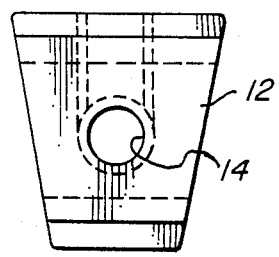
FIG. 7 is a left end view of the link of FIG. 6.

FIG. 1 illustrates one embodiment of the complete invention. A plurality of links 34 are connected together, forming a belt B. At one end of the belt B is connected an endmost or female coupling link 12. At the other end of the belt, a male coupling link 28 is connected thereto. Between the female link 12 and the male link 28 is positioned a rotatable link 20. After the female link 12 and the male link 28 are connected together a continuous belt is formed that can transmit torque between two or more shafts or rotating machines or parts (not shown).

As best seen in FIGS. 3 to 5, each intermediate links 34 to define the belt B comprises an individual link 34 formed of a flexible, tough plastic material which is generally trapozoidal in cross section. That is, the top surface 34A of the respective links are wider than the bottom surface 34B, with the respective side surfaces 34C and 34D tapering inwardly from top to bottom. The configuration of each link 34, when connected together, define a length of belt B having tapered side edges that can complement a pulley having a generally V-shaped groove. As best seen in FIG. 3, one end of the link 34 is provided with a female dovetail slot 22. The other end of the link is provided with a complementary male dovetail or projection 10. With links 34 as thus described, it will be apparent that a plurality of similarly shaped links 34 can be readily connected and secured in tandem by fitting the male dovetail or projection 10 or one link 34 into the dovetail end 22 of the next adjacent link 34 as best seen in FIG. 3. With this construction, any desired length of belt can be fabricated in the field to form any desired belt length. The respective ends of such link belt B are adjustably secured by complementary coupling link members as best seen in FIG. 2.

The connecting means for securing the endmost links 34 of the belt B comprises a mail link 28 which is provided with a recessed portion or counter bore 28A and associated bore 28B extending axially therethrough for loosely receiving a fasterner, e.g. a threaded bolt 16. The threaded bolt is preferably made of a material which is capable of some flexing, e.g. nylon. The head 24 of the bolt 16 is recessed in the counterbore 28A, with the shank of the bolt extending through and beyond the bore 26B. The arrangement is such that the bolt 16 is freely rotatable within the male link 28. One end of the male adjacent the bolt head 24 is provided with an end shape to complement the adjacent end of the endmost link 34 to which it connects. In the illustrated embodiment, the male link 28 is provided with a complementary dovetail slot to receive the dovetail projection 10 of the adjacent endmost link 34. It will be understood that the male link 28 has the same trapozoidal cross-sectional shape as its adjacent endmost link 34.

Complementing the male link 28 is a female link 12 which is connected to the endmost link 34 defining the other end of the link belt B. The female is similarly trapozoidal in cross-sectional shape and is provided with a threaded bore 14 extending therethrough. The end of the female link adjacent the connected endmost link 34 is provided with a complementary shape to connect to the endmost link 34. In the illustrated embodiment, the end of the female link 12 is provided with a dovetail projection 12A to be received in the dovetail slot 22 of link 34. To connect the two ends of the link belt B together, the fastener or bolt 16 of the male link 28 is threaded into the bore 14 of link 12.

To facilitate the rotation of the bolt 16 to effect the connection or joinder of the endmost link to form an endless belt, a rotor link 20 is provided. The rotor link 20 is provided with a bore 42 through which a portion of the bolt shank extends. To securely attach the rotor link 20 to the bolt shank, a pair of set screws 30 is provided. As shown, the set screws 30 are threaded in tapped holes disposed normal to the axis of the bolt shank. By tightening the set screws 30, the rotor link is secured to the bolt shank. Thus, by effecting rotation of the rotor link, the bolt is rotated for connection or disconnection with the bore 14 of the female link 12; depending upon the direction of rotation. It will be apparent that the connecting means described enables the ends of the belt B to be connected to form an endless belt, and also functions to adjust the desired degree of slack or play necessary to render the belt B effective. To fix the adjustment of the slack or play, the female link is provided with tapped holes for receiving one or more set screws 32 by which the female link is fixed to the bolt 16, as best seen in FIG. 13. It will be understood that the cross-section of the female link is similar to the cross-sectional shape of links 34 as herein described. If desired, a lock nut 18 may be provided to lock the bolt 16 in its desired position.

Figure 6:
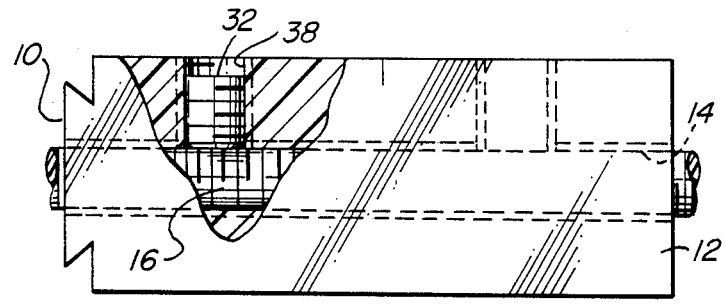
FIG. 6 is a side elevational view with a partial section illustrating one of the end coupling links of the invention.
Figure 8:
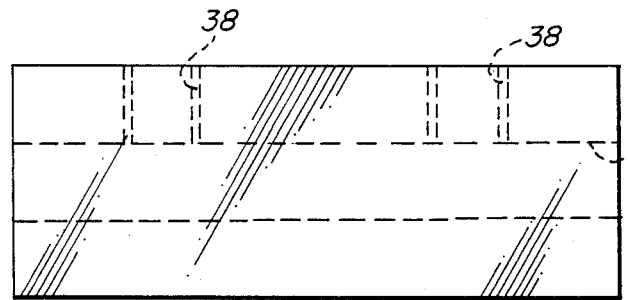
FIG. 8 is a side elevational view of the rotatable link of the invention.
Figure 9:
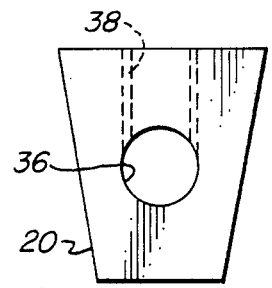
FIG. 9 is a right end view of the link of FIG. 8.
Figure 10:
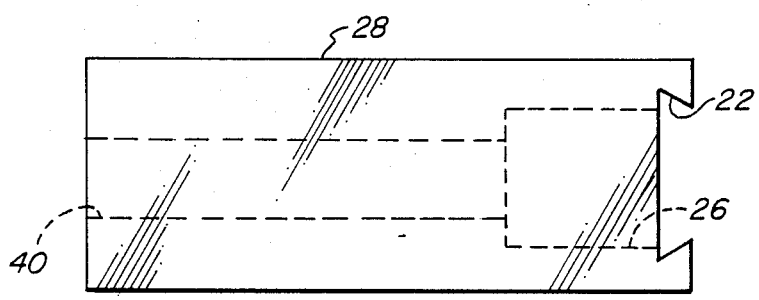
FIG. 10 is a plan view of the other end coupling or male link of the invention.
Figure 11:
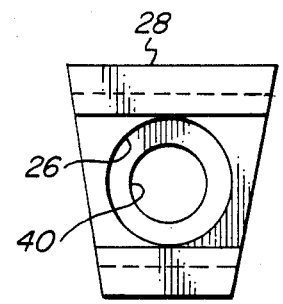
FIG. 11 is a right side view of the male link in FIG. 10.

FIG. 6 and 7 illustrate the female link 12 in more detail. Female link 12 has a bore 14 therein. Within bore 14 is threaded flexible bolt 16. Set screws 32 are threaded into set screw holes 38. The set screws are secured against bolt 16 preventing relative movement therebetween once the belt assembly has been adjusted. FIGS. 8 and 9 illustrate the rotor link 20 in more detail. The flexible bolt 16 fits within bore 36. Set screw holes 38 contain set screws (not shown) for preventing movement of bolt 16 within bore 36 so that when the rotator link is rotated the bolt 16 will not move relative thereto. FIGS. 10 and 11 illustrate the male link 28 in more detail. Male link 28 has a bore 40 therein. At one end of male link 28 is a female dovetail 22. At this same end is a recess 26.

Figure 12:
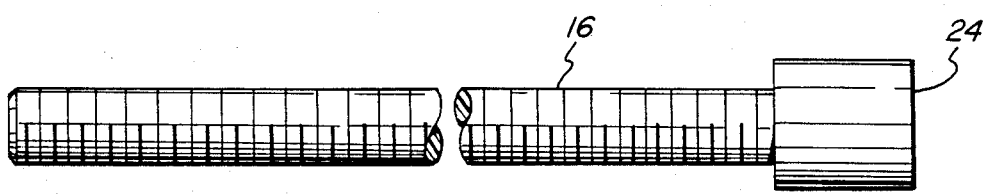
FIG. 12 is a side elevational view of a bolt or fastener of the invention.

FIG. 12 illustrates the flexible bolt 16. Bolt 16 has a head 24 at one end. The bolt 16 should be sufficiently flexible so that it will conform to the shape of the smallest pulley around which it must travel. If the pulleys around which the belt, and therefore the bolt 16, travel around are large the bolt 16 may not need to be flexible to provide contact with the pulleys. The bolt 16 has a diameter that permits free rotation in bores 40 and 36. The bolt 16 has threads that are adapted to thread into the threads in bore 14 in female link 12.

The functioning of links 12, 20, and 28 can best be illustrated with reference to FIG. 13. One end of the belt formed by links 34 is attached to one end of female link 12 by interlocking dovetails. A male link 28 is similar attached by interlocking dovetails to the other end of the belt formed by links 34. Between the female link 12 and male link 28 is positioned a rotator link 20. A bolt 16 extends through each bore 14, 36 and 40 of their respective links 12, 20 and 28. In attaching the two ends of the belt together the bolt 16 is placed through bore 40 in male link 28 before attaching it to link 34. After being attached to link 34, rotator link 20 is placed on the shaft of bolt 16 and positioned adjacent male link 28. A lock nut 18 is then threaded onto bolt 16. The female link is attached to the last link 34 needed to just fit around the pulleys over which the belt is placed. The slack or play in the belt is then taken up by threading bolt 16 into the threaded bore 14 in female link 12. The set screws 30 in rotator link 20 are secured against bolt 16 so that rotator link 20 is used to thread bolt 16 into threaded bore 14. The required amount of tension is easily acquired in the belt to prevent slippage. Once the desired adjustments are made, the lock nut 18 is securely tightened against rotator link 20 and the set screws 32 are tightened against bolt 16 further securing the bolt 16, preventing unintentional loosening of the belt.

FIG. 14 illustrates another embodiment of the invention. In FIG. 14, a continuous link 42 is used in place of the plurality of independent links 34. Once the appropriately sized continuous link is selected for the desired application, the belt can be adjusted by the attachment of the connecting links 28, 20 and 12 as herein described.

Additional adjustments can be made by pulley adjustment in either embodiment to provide consistent tension in the belt to compensate for wear and stretching of the belt during use.

Another embodiment of the present invention is illustrated in FIGS. 15-19, and comprises the preferred embodiment. In this embodiment, the adjustable belt assembly 40 comprises a series of similarly constructed links 50 detachably coupled together as will be herein described. The link 50 as best seen in FIG. 16 has a male end portion 56 at one end and a female end portion 54 at the other end. The female end portion 54 is defined by opposed spaced ears 53 projecting from the main body portion 51. Each of the ears 53 is provided with aligned coupling holes 52 extending laterally therethrough. The other end of link 50 has a male portion 56 having pin 60 extending laterally thereof. The pin 60 may be securely fitted or connected to end 56 or be formed integral therewith. If desired, the end of the pin may be tapered to facilitate insertion in holes 52. The cross sectional shape of link 50 can easily be seen in FIGS. 16 and 18. The link 50 has a top 50A and a bottom 50B plane with tapered sides adapted to accomodate pulleys common to belt drives. The cross-sectional shape resembles that of an isosceles trapezoid. The bottom or narrow end of the belt is provided with transverse recesses or indentations 62 which contribute to the flexibility of the link and the belt when assembled, permitting the assembled belt to more easily conform to the contours of drive pulleys as the belt rides over the pulleys. This is evident in FIG. 15.

Each link 50 is made of a durable, flexible material such as polyurethane, thermoplastic, synthetic resin, or similar material. The material must be flexible enough to permit easy hand assembly, and strong enough to prohibit separation during operation.

The embodiment illustrated in FIGS. 15-19 facilitates easy hand assembly. This is accomplished by positioning or forcing the male portion 56 of a link 50 within the female portion 54 of the next adjacent link 50. The pin 60 extending transversely of the male portion 56 of a link 50 can be manually fitted into the coupling holes 52 by a slight twisting motion. When assembled, the pin 60 also functions to permit the individual links 50 to pivot with respect to one another, and prevents the links from separating. Because of the flexibility of ears 53 that form the female portion 54 and the male end portion 56, the links 50 can be hand assembled to secure the pin 60 in the hole 52. This is accomplished by twisting the male portion 56 with pin 60 to insert the pin into the female portion 54 of an adjacent link 50. As described, a continuous belt of any desired length can be quickly assembled without the use of any tools by snap fitting the end of one link 50 to the next adjacent end of another link 50.

While the invention has been described with respect to several embodiments, it should be understood and appreciated that variations and modifications may be without departing from the spirit or scope of the invention.

What is claimed is:

1. A link for use in a continuous belt formed by a plurality of links, each said link comprising:
   a body portion, a male portion at one end of said body, a pin extending transversely of said male portion, and a female portion at the other end of said body portion adapted to receive a male portion of a similar link, said female portion having a hole transversely therethrough to receive said pin, said female portion comprising, a pair of spaced flexible ears, each of said ears having a hole transversely therethrough adapted to receive said pin, said body, male and female portion being integrally formed of a flexible polyurethane, said body having a cross-sectional shape of an isosceles trapezoid, wherein said link has a bottom portion, said bottom portion having transversely formed indentations to enhance the flexibility of said link.

2. An endless, readily adjustable flexible belt comprising:

a plurality of similarly constructed links connected in end to end relationship to form an endless belt, each of said links comprising a molded link having a body portion and opposed end portions, said body portions having a top and bottom plane, one of said end portions having spaced apart projecting ears to define a female end portion, and the other of said end portion having a center projecting portion defining a male end portion, a pin extending transversely of said male end portion, said ears having aligned holes formed therein, said holes being adapted to receive the transverse pin of the next adjacent link, said body portion having spaced apart top plane and a bottom plane, tapered side walls disposed between said top and bottom plane, and said bottom including transversely extending indentations longitudinally spaced therealong.

3. A link as in claim 2 wherein:

said body, male and female portion is integrally formed of flexible polyurethane.

4. A link for use in a continuous belt formed by a plurality of links, each of said links comprising:

a body portion, said body portion having a male portion extending at one end of said body portion, a pin protruding transversely of said male portion, a female portion extending from the other end of said body portion, said female portion comprising a pair of spaced apart ears, each of said spaced apart ears having aligned holes formed therein, said female portion being adapted to receive a male portion of a similarly constructed link and secured thereby by engaging the pin of a similarly constructed link in said holes, said body, male and female portions, being integrally formed of a flexible material whereby adjacent links can be readily assembled by snap fitting the male portion of one link to the female portion of an adjacent link wherein said link has a cross-sectional shape of an isosceles trapezoid.

5. A link for use in a continuous belt formed of a plurality of links, each of said links comprising:

a body portion, said body portion having a male portion extending at one end of said body portion, a pin protruding transversely of said male portion, a female portion extending from the other end of said body portion, said female portion comprising a pair of spaced apart ears, each of said spaced apart ears having aligned holes formed therein, said female portion being adapted to receive a male portion of a similarly constructed link and secured thereto by engaging the pin of a similarly constructed link in said holes, said body, male and female portions, being integrally formed of a flexible material whereby adjacent links can be readily assembled by snap fitting the male portion of one link to the female portion of an adjacent link, wherein said link has a bottom portion, said bottom portion having transversely formed indentations to enhance the flexibility of said link.

* * * * *